US012716540B2

(12) United States Patent
Geertsen

(10) Patent No.: US 12,716,540 B2
(45) Date of Patent: Aug. 25, 2026

(54) DEVICE FOR CLOSING OFF A SEGMENT OF PIPE-IN-PIPE PIPELINE COMPRISING A WATER DETECTOR

(71) Applicant: ITP SA, Louveciennes (FR)

(72) Inventor: Christian Geertsen, Versailles (FR)

(73) Assignee: ITP SA, Louveciennes (FR)

( * ) Notice: Subject to any disclaimer, the term of this patent is extended or adjusted under 35 U.S.C. 154(b) by 489 days.

(21) Appl. No.: 18/221,926

(22) Filed: Jul. 14, 2023

(65) Prior Publication Data

US 2024/0019068 A1 Jan. 18, 2024

(30) Foreign Application Priority Data

Jul. 18, 2022 (FR) ...................................... 2207300

(51) Int. Cl.

| | |
|---|---|
| ***F16L 55/115*** | (2006.01) |
| ***B65D 59/06*** | (2006.01) |
| ***F16L 55/11*** | (2006.01) |
| ***F16L 59/14*** | (2006.01) |
| ***F16L 59/16*** | (2006.01) |

(52) U.S. Cl.
CPC .......... *F16L 55/1116* (2013.01); *B65D 59/06* (2013.01); *F16L 59/143* (2013.01); *F16L 59/166* (2013.01)

(58) Field of Classification Search
CPC ...... F16L 55/00; F16L 55/005; F16L 55/1116; F16L 55/115; F16L 55/1286; F16L 59/143; F16L 59/166; F16L 2201/30; F16L 55/11; F16L 55/128; F16L 55/1612; F16L 57/005; F16L 59/10; F16L 59/103; F16L 59/106; F16L 37/56; F16L 37/565; F16L 19/04; G01M 3/022; G01M 3/16; G01M 3/183; F17D 5/02; F17D 5/04; B65D 59/06
USPC ............................ 138/89, 90, 111, 113, 114
See application file for complete search history.

(56) References Cited

U.S. PATENT DOCUMENTS

| | | | |
|---|---|---|---|
| 2,695,254 A * | 11/1954 | Isenberg | F16L 59/166 138/109 |
| 4,576,661 A * | 3/1986 | Persson | F16L 59/166 174/76 |
| 5,974,653 A * | 11/1999 | Chulick | F16L 59/166 29/525.01 |
| 2011/0214490 A1 * | 9/2011 | Sakita | G08B 21/20 73/73 |

(Continued)

FOREIGN PATENT DOCUMENTS

| | | | |
|---|---|---|---|
| DE | 102018212993 A1 * | 2/2020 | F16L 59/143 |
| DK | 202100795 A1 * | 9/2022 | F16L 57/06 |

OTHER PUBLICATIONS

Mar. 8, 2023 Search Report issued in French Patent Application No. 2207300.

*Primary Examiner* — Craig M Schneider
*Assistant Examiner* — Joshua D Leary
(74) *Attorney, Agent, or Firm* — Oliff PLC

(57) ABSTRACT

A device for sealing off a segment of pipe-in-pipe pipeline including an inner pipe and an outer pipe between which an insulating material is interposed, and including a water detector. The device includes: a first plug for closing off the inner pipe, a tubular extension welded to the end of the outer pipe, the free end of the extension extending beyond the first plug and being closed off by a second plug, and a means for fixing the position of the inner pipe and outer pipe, integral with the extension.

9 Claims, 3 Drawing Sheets

(56) References Cited

U.S. PATENT DOCUMENTS

2020/0292136 A1* 9/2020 Long, III ............. G05B 23/021

* cited by examiner

DEVICE FOR CLOSING OFF A SEGMENT OF PIPE-IN-PIPE PIPELINE COMPRISING A WATER DETECTOR

FIELD OF THE INVENTION

The technical field of the present invention is that of pipe-in-pipes or pipelines whose ends are open and which ends are to be protected against any intrusion of solid or liquid products. These pipelines are made up of sections that are transported to the installation site and assembled there by welding, or optionally transported to an intermediate location where they are assembled within intermediate-sized structures, for example modules of gas and liquid treatment or transport units.

PRIOR ART

For several decades, the oil industry has been using thermally-insulated pipe-in-pipe pipelines formed by successively assembling, by welding, sections of pipe-in-pipes between 6 meters and 50 meters in length. The aim is to reduce heat loss between a hot or cold fluid circulating in said pipeline and the outside environment.

Applications are often found in the oil industry, but can also involve other fields such as the transport of very hot air in the concentrating solar power field, vegetable oils or cryogenic fluids such as LNG or liquefied hydrogen.

The pipelines take the form of pipe-in-pipe pipelines, where the outer sleeve helps to create a sealed annular space, reducing the pressure in the annulus to optimize the thermal performance of the insulation and mechanically protecting the thermal insulation system from the external environment (humidity, pressure, mechanical damages). The pipelines are prefabricated in the form of segments that are joined together to form said pipeline. The ends of these segments are typically caulked, which offers only limited protection when being handled during manufacture and during transport and storage before the segments are assembled to form the pipeline.

The intrusion of water in liquid form is a particularly serious problem, because liquid water soaks the insulation, degrading the thermal performance thereof. This performance cannot be recovered during subsequent drying, as the capillary forces of the water will locally compact the insulation and cause it to lose its microporous nature. A distinction is made with water in gaseous form, which can adsorb onto the insulation but does not lead to degraded performance, as adsorption is a reversible phenomenon unlike absorption.

It is thus important not only to prevent water from penetrating into the insulating material, but also to prevent any penetration of liquid or solid products and, to improve safety, to provide a device for detecting the presence of water.

The referenced publication http://www.gulfcooltherm-.com/leak-detection-system.html proposes a device for detecting the presence of water in a pipe-in-pipe pipeline. To this end, conductive wires are inserted into the insulating material and these wires are connected to a detection unit.

The referenced publication https://wideco-se/en/monitoring-solutions/monitoring-products/ proposes installing conductive wires between the insulating material and the outer pipe of the pipeline to detect the presence of water.

The proposed solutions only aim to detect the presence of water in the assembled pipeline, but do not aim in any way to monitor the ends of the prefabricated segments before the pipeline is actually built.

DISCLOSURE OF THE INVENTION

The aim of the invention is to propose a device for sealing off a segment of pipeline so as to isolate this segment from the various materials liable to pollute it, for example with water that is harmful to maintaining thermal insulation.

The invention thus relates to a device for sealing off a segment of pipe-in-pipe pipeline consisting of an inner pipe and an outer pipe between which an insulating material is interposed, comprising a water detector, characterized in that it comprises:

- a first plug for closing off the inner pipe,
- a tubular extension welded to the end of the outer pipe, the free end of said extension extending beyond the first plug and being closed off by a second plug,
- a means for fixing the position of the inner and outer pipes integral with the extension.

According to one feature of the invention, the fixing means consists of a bead bearing against the first plug and held by a plate integral with the extension.

According to another feature of the invention, the device comprises a ring made of a flexible material integral with the extension, a water presence detector installed inside said ring and a unit for recording the electric current powering the detector.

Advantageously, the detector consists of two twisted conductor wires electrically insulated from one another by a porous material.

According to yet another feature of the invention, the device includes a temperature detector integrated into the recording unit and associated with a storage memory.

According to yet another feature of the invention, the recording unit is capable of scanning, at a predetermined frequency, the state of conduction of the detector and of storing the measurement results in memory.

According to yet another feature of the invention, the first and second plugs are made of a polymer material or equivalent that is transparent to electromagnetic waves.

According to yet another feature of the invention, the detector can be queried remotely in order to retrieve the data collected.

Advantageously, the joint analysis of temperature and water presence data over time allows to eliminate false positives.

According to a very first advantage of the invention, perfect insulation of the end of the segment of pipeline is achieved using a device that is simple to implement.

According to another advantage of the invention, the joint analysis of the temperature and conduction data allows to differentiate the presence of moisture from the effective presence of water at the end of the segment.

According to yet another advantage of the invention, the data stored in the storage unit can be retrieved at any time.

BRIEF DESCRIPTION OF THE DRAWINGS

Other features, advantages and details of the invention will be better understood upon reading the following description given with reference to the drawings in which.

DETAILED DESCRIPTION OF EMBODIMENTS OF THE INVENTION

Figure 1:
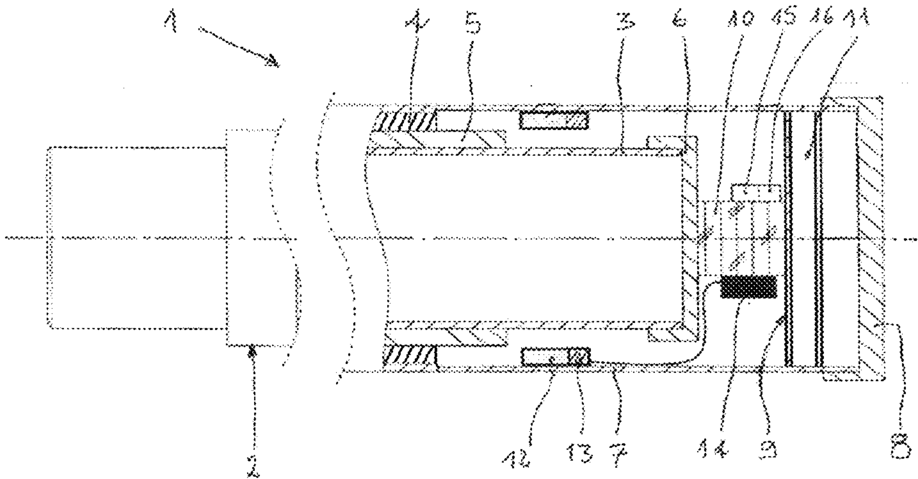
FIG. 1 shows a cross-section of the end of a segment of pipe-in-pipe pipeline.

The invention will now be described in more detail. As stated hereinabove, a pipe-in-pipe pipeline is made up of a plurality of segments connected together to form lengths in the order of several hundred meters or several kilometers. This involves protecting the free ends of the segments, either during transport or during the construction periods, before final closure of the annulus.

In this case, the focused is on so-called "continuous annulus" pipelines, where the annular space extends over hundreds of meters or even kilometers, thus allowing the vacuum to be created from a single pumping point.

These pipelines are traditionally built from pipes measuring about 12 m in length. These are gathered at a first industrial site, where insulated assemblies comprising an inner pipe, thermal insulation and an outer pipe are produced before being shipped to the place of final use or an intermediate assembly site, where intermediate-sized assemblies are manufactured; these can, for example, be modules measuring 30-50 m in length and incorporating pipelines and any other kind of equipment. In order to preserve the insulation, sealing devices must be installed in order to protect the ends of these segments or modules from water intrusion, and specific preservation procedures are provided.

Despite this, the subsequent transfer and construction phases are periods of vulnerability for the assemblies, as the protection systems have their own modes of failure and each construction operation requires them to be removed and reinstalled after work has been completed.

Moreover, from a contractual point of view, a transfer of responsibility and/or ownership of the pipeline elements may occur at each of these stages between the various stakeholders involved in the manufacturing process. The ability to demonstrate the integrity of the system transferred at each stage is thus particularly advantageous.

It is thus important both to protect the ends of each segment using a sealing device and to check the tightness of this device in order to detect the presence of water.

According to the invention, the device 1 for sealing off a segment 2 of a pipe-in-pipe pipeline is intended to close off the end of this segment which comprises an inner pipe 3 and an outer pipe 4 between which an insulating material 5 is interposed.

The device comprises a first plug 6 for closing off the inner pipe 3, a tubular extension 7 welded to the end of the outer pipe 4. The figure shows that the free end of said tubular extension 7 extends beyond the first plug 6. Circumferential adhesive strips can be used to reinforce the tightness of the spot weld between the extension 7 and the outer pipe.

The figure also shows that the extension 7 is butt-welded to the outer pipe 4. It goes without saying that this extension can be fixed to the outer pipe in any way, for example by covering the inside or outside.

The free end of the extension 7 is closed off by a second plug 8.

The first plug 6 and second plug 8 are made of a polymer material or equivalent that is transparent to electromagnetic waves.

The device is completed by a means 9 for fixing the position of the inner pipe 3 and outer pipe 4 integral with the extension 7.

The fixing means 9 consists of a bead 10 bearing against the first plug 6 and held by a metal beam 11 integral with the extension 7. The purpose of this fixing means is to prevent any relative sliding between the inner and outer pipes, since the outer pipe can slide along the insulator during the pipeline manufacturing phases.

The presence of water is detected by means of a ring 12 made of a flexible material integral with the extension 7, around which a water presence detector 13 is installed. The flexible ring ensures that the detector is correctly pressed against the inside of the outer pipe around the entire periphery thereof. This detector is connected to a unit 14 for recording the electric current powering said detector 13.

The detector 13 can consist of two twisted conductor wires electrically insulated from one another by a porous material. Thus, when this porous material is soaked with water, electrical contact is established between the two wires, creating a short-circuit therebetween. This information is recorded in the unit 14.

This type of detector is well known in the literature and does not need to be described in detail. A person skilled in the art can easily integrate this detector into the ring of the device according to the invention and connect it to the recording unit.

The device is completed by a temperature detector 15 integrated into the recording unit 14 and associated with a storage memory 16. This unit is capable of scanning, at a predetermined frequency, the state of conduction of the detectors 13 and 15 and of storing the measurement results in memory. The temperature and humidity results collected are retrieved by a querying unit in relation to a geographical location datum using electromagnetic waves. The distance of the exchange between the unit 14 and the querying unit varies depending on the obstacles and the data transfer rate, and can be up to about 500 m. The data collected are then transferred to an analysis and processing system, again by electromagnetic waves, using the telephone network for example. These data can be encrypted in accordance with current standards.

It goes without saying that the analysis system differentiates between the various detectors, allows time traces of the measurements to be created, allows displaying where the measurements were taken, allows alarm thresholds to be set, allows user access and modification rights to be defined, allows data to be downloaded for more refined use, or allows reports to be created.

Data processing takes into account the fact that the twisted wires create an extremely sensitive liquid water detector, for example detecting as soon as a few drops of water appear, which establishes electrical conduction and generates a signal indicating the presence of water. The response is thus binary of the on-off type. This type of operation creates a risk of false positive results due to the presence of minimal, unimportant condensation of a few drops of water which will evaporate afterwards without damaging the thermal insulation.

The combined use of temperature and water presence measurement data allows events involving condensation that will evaporate after a few hours to be differentiated from real water intrusions, which do not vary according to the outside temperature. Indeed, minimal condensation will inevitably appear in conjunction with a fairly rapid drop in temperature and then disappear when the temperature rises again or stabilizes.

Figure 2:
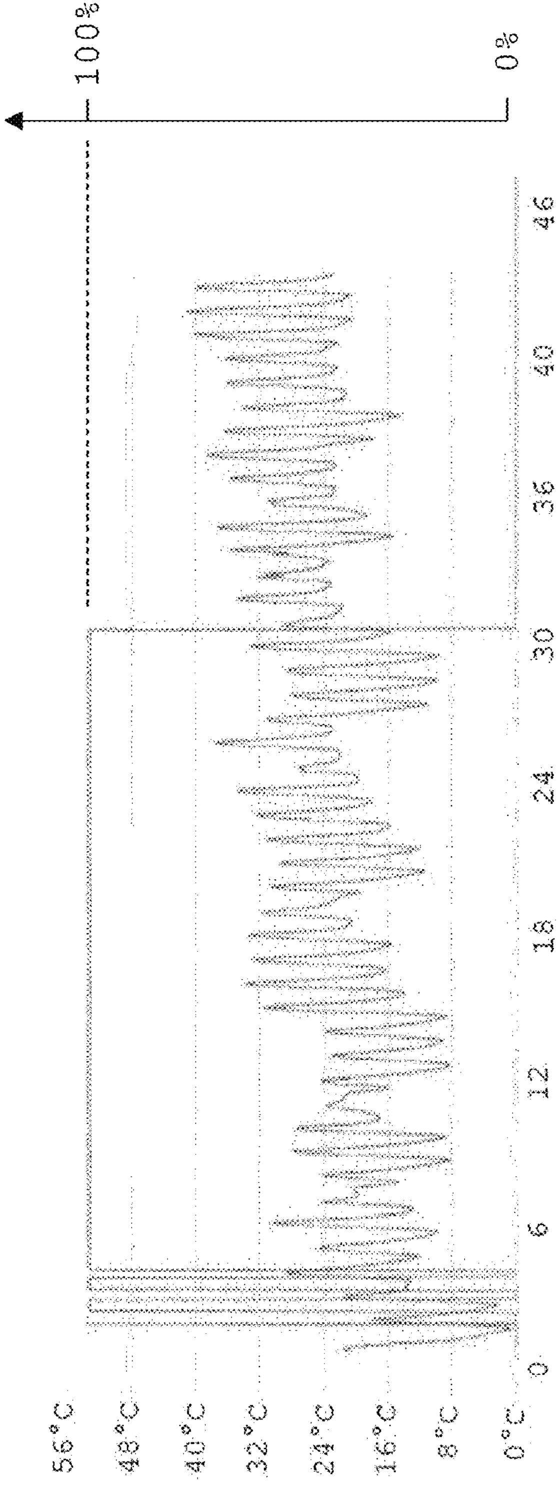
FIG. 2 is a graph of the measurements taken, showing the presence of water.
Figure 3:
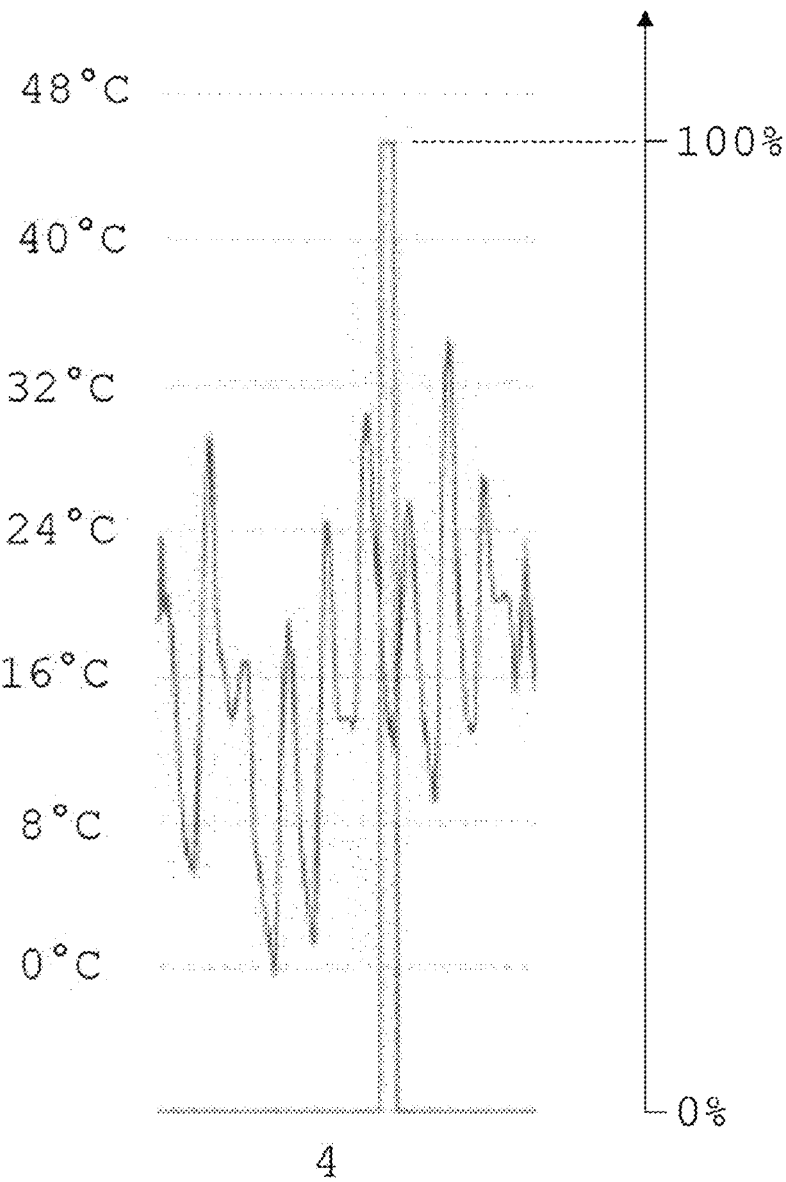
FIG. 3 is a graph showing the absence of water.

FIG. 2 shows the time trace for the temperature and humidity measurements. The scale on the left represents temperature, and the scale on the right represents humidity from 0 to 100%, all over a period of 48 days. The temperature trace follows a 24-hour period. At the beginning of the humidity trace, short events (lasting a few hours) can be seen to appear on the temperature rising edge, and finally, at the fourth event, the presence of water becomes permanent. A puddle of water was subsequently identified on opening.

FIG. 2 illustrates the appearance of water on a falling edge before it disappeared. This event can thus be classified as non-hazardous.

The invention relates to an assembly including physical elements: a system for closing off the pipeline for transport, a ring for presenting the sensor on the inner periphery of the pipe, a device for measuring water and temperature, a system for transmitting and presenting the data, and a principle for processing the data to reduce the rate of false positives.

The invention claimed is:

1. A device for sealing off a segment of pipe-in-pipe pipeline consisting of an inner pipe and an outer pipe between which an insulating material is interposed, wherein the device comprises:

a first plug for closing off the inner pipe, a tubular extension welded to the end of the outer pipe, the free end of the extension extending beyond the first plug and being closed off by a second plug, a means for fixing the position of the inner pipe and outer pipe integral with the extension, and a water presence detector.

2. The device for sealing a segment of pipe-in-pipe pipeline according to claim 1, wherein the fixing means consists of a bead bearing against the first plug and held by a plate integral with the extension.

3. The device for sealing off a segment of pipe-in-pipe pipeline according to claim 1, wherein the device comprises a ring made of a flexible material integral with the extension, and a unit for recording the electric current powering the water presence detector, wherein the water presence detector is installed around the ring.

4. The device for sealing a segment of pipe-in-pipe pipeline according to claim 3, wherein the water presence detector consists of two twisted conductor wires electrically insulated from one another by a porous material.

5. The device for sealing off a segment of pipe-in-pipe pipeline according to claim 3, wherein the device includes a temperature detector integrated into the recording unit and comprising a storage memory.

6. The device for sealing off a segment of pipe-in-pipe pipeline according to claim 3, wherein the recording unit is capable of scanning, at a predetermined frequency, the state of conduction of the detector and of storing the measurement results in memory.

7. The device for sealing off a segment of pipe-in-pipe pipeline according to claim 6, wherein the detector is configured to be queried remotely in order to retrieve the recorded state of conduction of the detector.

8. The device for sealing off a segment of pipe-in-pipe pipeline according to claim 3, wherein the detector is configured to be queried remotely in order to retrieve the recorded electric current powering the water presence detector.

9. The device for sealing off a segment of pipe-in-pipe pipeline according to claim 1, wherein the first and second plugs are made of a polymer material that is transparent to electromagnetic waves.

* * * * *